Oct. 17, 1933.    G. A. BIGGS    1,931,158
HYDRAULIC TURBINE
Filed June 21, 1932    3 Sheets—Sheet 1

Oct. 17, 1933.  G. A. BIGGS  1,931,158
HYDRAULIC TURBINE
Filed June 21, 1932  3 Sheets-Sheet 2
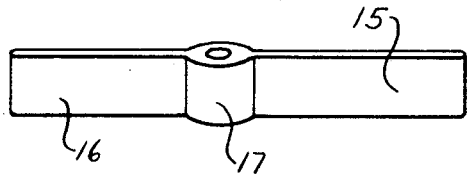
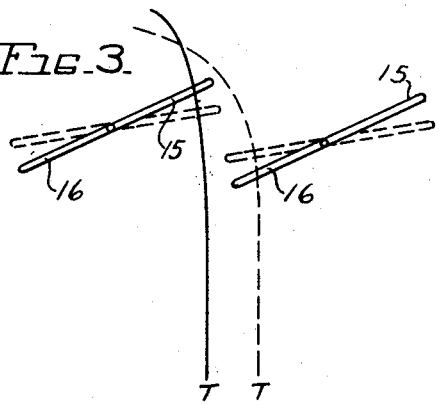
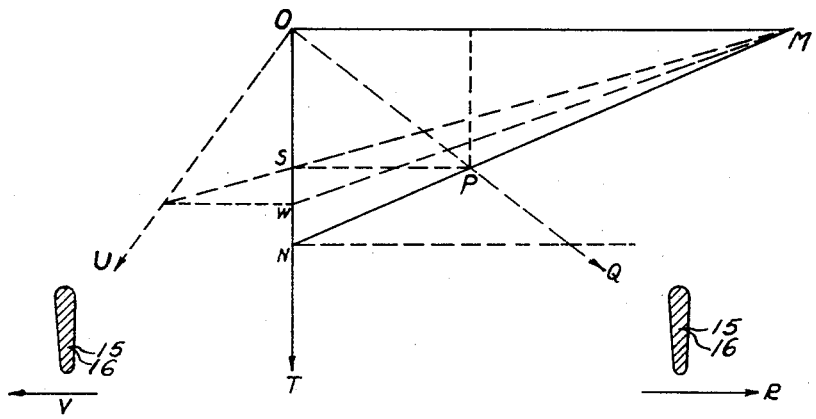
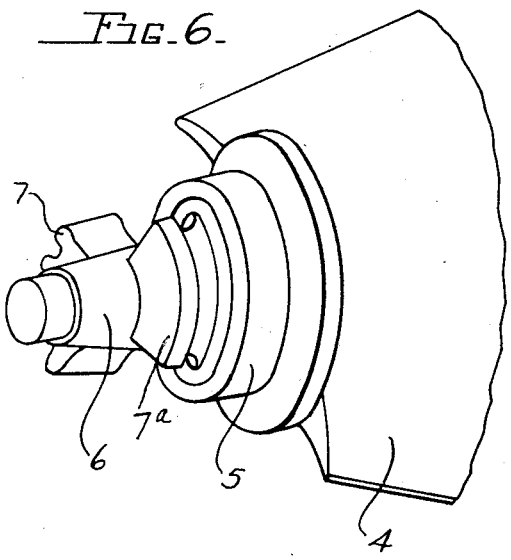
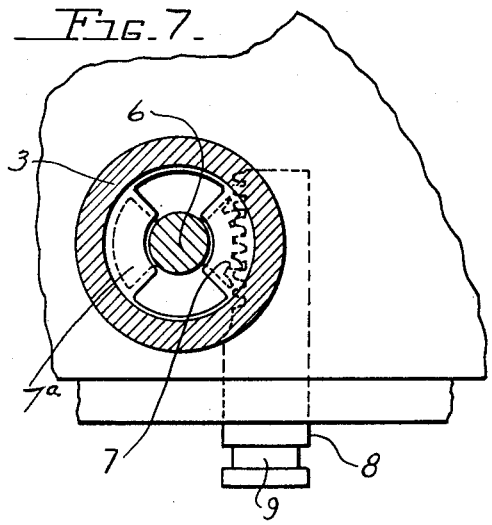
INVENTOR
George A. Biggs
BY
ATTORNEYS Oct. 17, 1933.  G. A. BIGGS  1,931,158
HYDRAULIC TURBINE
Filed June 21, 1932   3 Sheets-Sheet 3

INVENTOR
George A. Biggs
BY
ATTORNEYS

Patented Oct. 17, 1933

1,931,158

UNITED STATES PATENT OFFICE 1,931,158

HYDRAULIC TURBINE

George A. Biggs, Springfield, Ohio, assignor to The James Leffel & Company, Springfield, Ohio, a corporation of Ohio Application June 21, 1932. Serial No. 618,491

20 Claims. (Cl. 253—144)

My invention relates to hydraulic turbines and, in particular, to an apparatus and method of self-adjustment for adjustable turbine blades.

It is my object to provide a means and method of adjusting turbine blades according to the water flow through the turbine automatically but without affecting the control remotely.

In particular, it is my object to provide a means of adjusting the runner blades by the water flow itself directly at the runner and not remotely therefrom by various arrangements which have heretofore been customary in this art.

Referring to the drawings:

Figure 2 is a perspective of the adjusting vane;

Figure 3 is a diagrammatic view showing the blade adjustable positions;

Figure 4 is a diagram indicating the effect of different water flows on the adjusting mechanism and the buckets;

Figure 6 is a perspective of the hub of the blade;

Figure 7 is a section on the line 7—7 of Figure 5.

Figure 1:
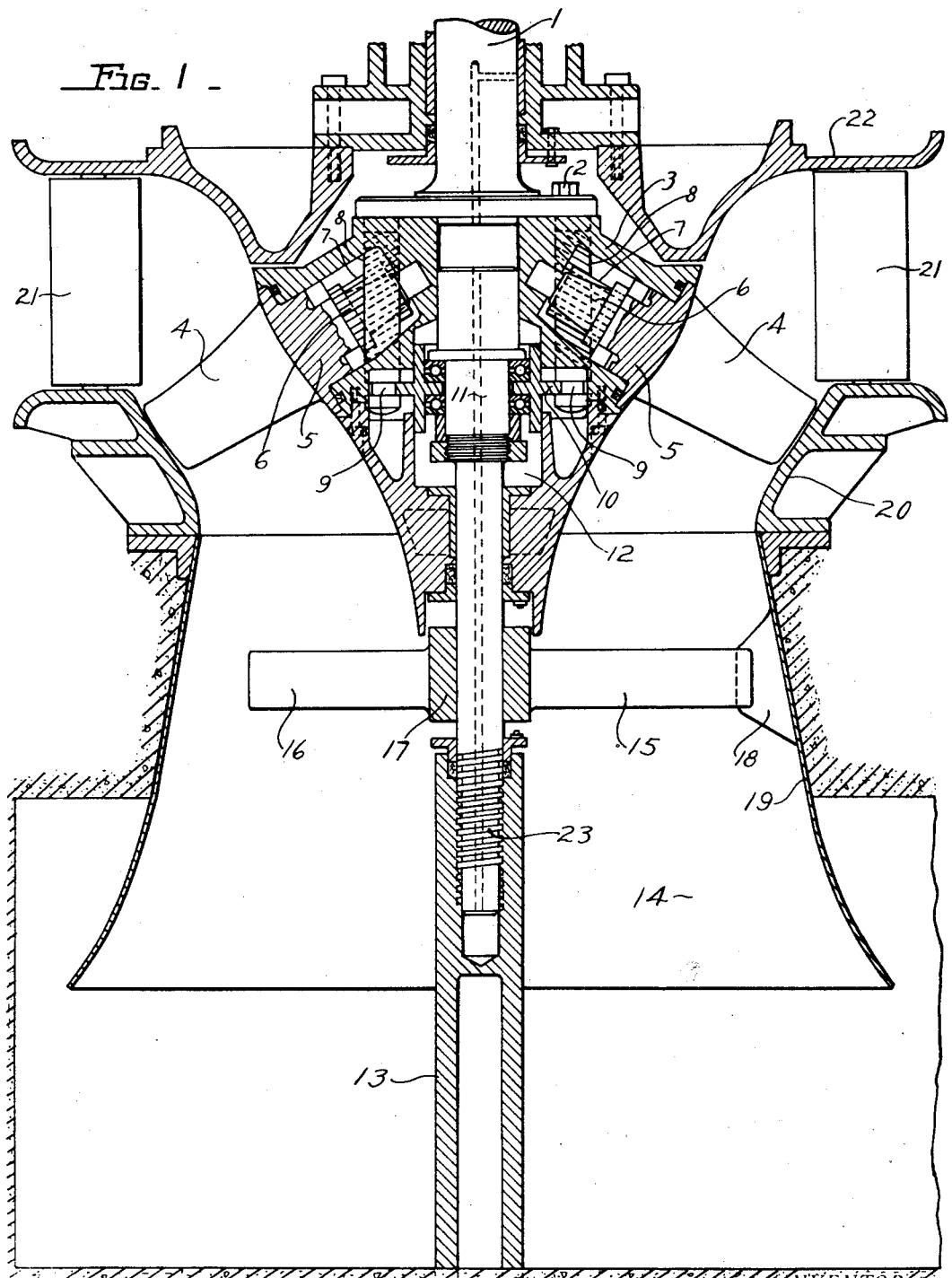
Figure 1 is a half section through one form of such a runner and its adjusting mechanism.
Figure 5:
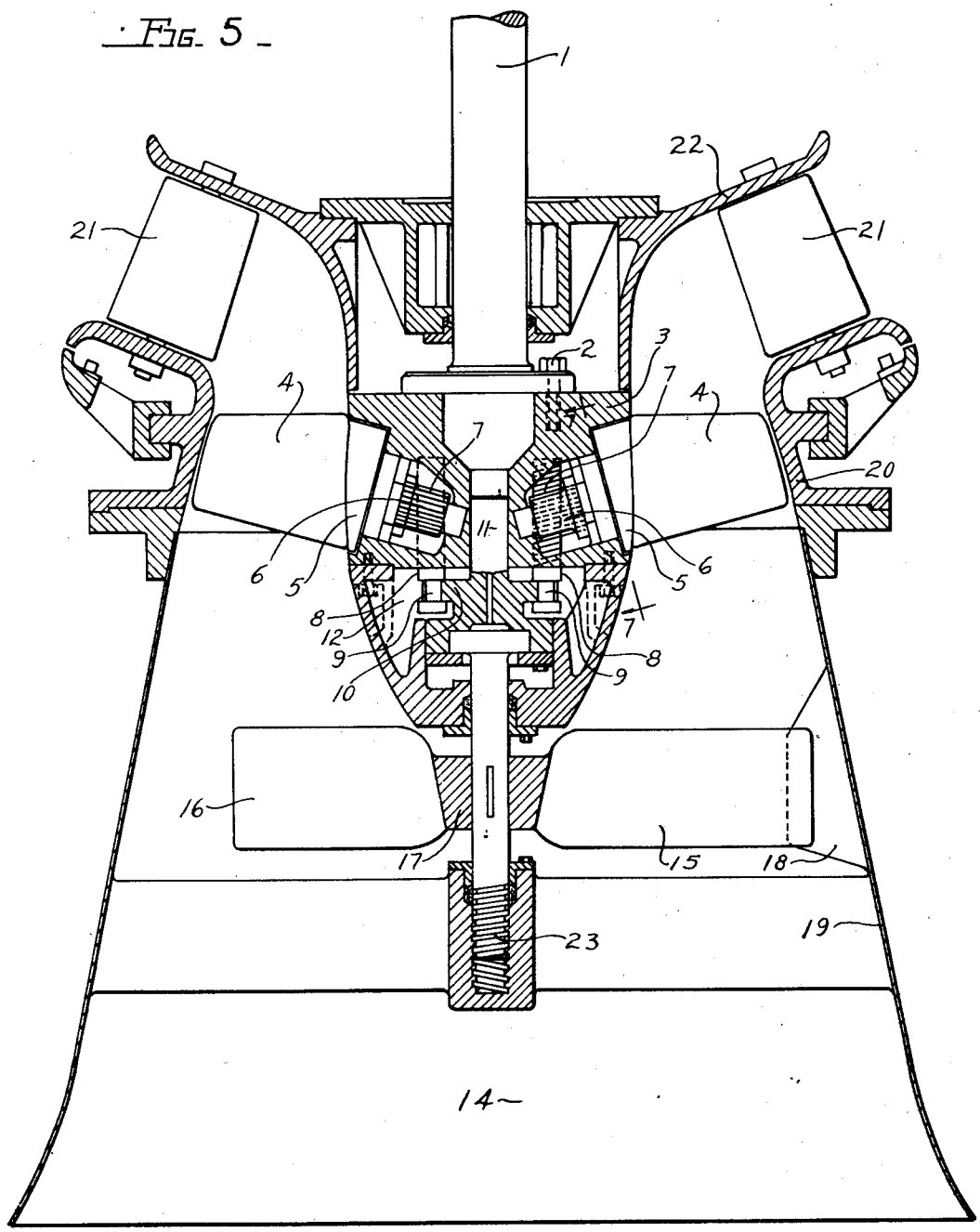
Figure 5 is a modified view showing a different form of gate and blade arrangement.

Referring to the drawings, 1 is a runner shaft to which is bolted by the bolts 2 a hub 3 having a plurality of rotatable blades 4 with hubs 5 and shafts 6. These blades are preferably diagonally disposed with respect to the runner shaft axis.

The shaft 6 is provided with a lug 7a and an oppositely disposed gear 7 engaging a rack 8 that reciprocates in the hub, the lower end of which has an annular collar 9 engaging with a flange sleeve 10 mounted on an adjusting shaft 11.

This shaft reciprocates vertically in the chamber 12 in the hub 3 and extends below the hub into a stationary sleeve 13 in the draft tube 14.

On this adjusting shaft 11 is mounted the adjusting vanes 15 and 16 of different length mounted on a hub 17 which attaches these blades to the shaft 11. The longer of the blades is adapted to engage, upon rotation, with a stop 18 on the wall of the draft tube 19.

The usual draft tube ring 20, adjustable gates 21 and gate ring 22 are provided.

As the water enters through the gates, it passes over the buckets 4 and engages the adjusting vanes 15 and 16. The extent of such engagement depends upon the amount of water flowing through the draft tube over the blades of the runner. So long as the water flows in vertical lines in the draft tube the vanes 15 and 16 will not rotate. Under such conditions, the discharge diagram will be like ONM in Figure 4. If the gates 21 close so that the diagram becomes OMP, then the water will flow in the direction of Q. This strikes the adjusting vanes 15 and 16 at an angle and causes the vanes to rotate. This rotation of the shaft 11 causes it to move downwardly due to the use of the screw 23 in the stationary member 13. The downward movement of the adjusting shaft 11 through the intermediate gear connections with the buckets 4 rotates the buckets on their axes until they produce a discharge angle OMS at which time the water is flowing vertically again in the direction T and then the vanes 15 and 16 come to rest and hold the blades on the runner hub in that position. There is no tendency for the runner vanes 15 and 16 to drift either forwardly or backwardly because any change in their position immediately affects the runner blades 4 and consequently the vertically flowing stream.

If the gates open wider, then the stream will immediately assume a spiral effect making the discharge angle like OMU. This produces pressure on the other side of the blades 15 and 16 and causes the adjusting runner vanes 15 and 16 to revolve in the direction $v$ which raises the screw 23 causing the runner blades 4 to rotate to a wider open position as indicated in Figure 3. This changes the discharge angle again to vertical flowing making the angle OMW.

The arrangement is such that about one turn of the blades 15 and 16 causes the runner blades 4 to rotate over their full range.

It will be understood that I desire to comprehend within my invention such modifications as may be necessary to adapt it to varying conditions and uses.

Having thus fully described my invention, what I claim as new and desire to secure by Letters Patent, is:

1. In a hydraulic turbine, a runner comprising a runner shaft and hub, a plurality of adjustable blades mounted thereon, water-operated, adjusting vanes associated with said runner connected with the runner blades for adjusting them according to the flow of water over the runner.

2. In a hydraulic turbine, a runner comprising a runner shaft and hub, a plurality of adjustable blades mounted thereon, water-operated, adjusting vanes associated with said runner connected with the runner blades for adjusting them according to the flow of water over the runner, and means for interconnecting said adjusting vanes and the runner blades, whereby the runner can rotate independently of the adjusting vanes while being constantly adjusted thereby.

3. In a hydraulic turbine, a runner comprising a runner shaft and hub, a plurality of adjustable blades mounted thereon, water-operated, adjusting vanes associated with said runner connected with the runner blades for adjusting them according to the flow of water over the runner, and gate means for adjusting the flow of water over said runner blades and the adjusting vanes.

4. In a hydraulic turbine, a runner comprising a runner shaft and hub, a plurality of adjustable blades mounted thereon, water-operated, adjusting vanes associated with said runner connected with the runner blades for adjusting them according to the flow of water over the runner, and means for interconnecting said adjusting vanes and the runner blades, whereby said runner can rotate independently of the adjusting vanes while being constantly adjusted thereby, and gate means for adjusting the flow of water over said runner blades and the adjusting vanes.

5. In a hydraulic turbine runner comprising a shaft and hub, a plurality of rotatable runner blades, adjusting vane means therebelow engaged by the same water that passes over the runner blades, and means interconnecting said adjusting vanes and said blades for adjusting their position according to the nature of the water flow thereover.

6. In a hydraulic turbine runner comprising a shaft and hub, a plurality of rotatable runner blades, adjusting vane means therebelow engaged by the same water that passes over the runner blades, and means interconnecting said adjusting vanes and said blades for adjusting their position according to the nature of the water flow thereover without stopping the operation of the turbine runner.

7. In a hydraulic turbine, a draft tube, a runner therein comprising a shaft, a hub and a plurality of adjustable blades adapted to change the angularity of the water flowing thereover into the draft tube, adjusting vanes connected to said runner blades adapted to be rotated according to the flow of the water through the draft tube in which the adjusting vanes are located whereby the runner blades are adjusted according to the flow of water thereover.

8. In a hydraulic turbine, a draft tube, a runner therein having adjustable blades, rotatable adjusting vanes having their faces vertically disposed adapted to be rotated when the water flowing through the draft tube assumes an angle of flow with respect to the vertical faces of the adjusting vanes, and means connected to said adjusting vanes and said runner blades for adjusting the runner blades.

9. In a hydraulic turbine, a draft tube, a runner therein having adjustable blades, rotatable adjusting vanes having their faces vertically disposed adapted to be rotated when the water flowing through the draft tube assumes an angle of flow with respect to the vertical faces of the adjusing vanes, means connected to said adjusting vanes and said runner blades for adjusting the runner blades, and gates for controlling the amount of water admitted to the draft tube over the runner blades and adjusting vanes, whereby the blades will be adjusted in position according to the flow of water through the draft tube.

10. In a hydraulic turbine runner, a shaft, a hollow hub, a plurality of adjustable blades on said hub, a reciprocatory adjusting shaft extending into and from said hub, means interconnecting said blades and said adjusting shaft for adjusting said blades without preventing the rotation of the blades with the runner hub, adjusting vanes on said adjusting shaft below the blades on the runner hub, and means associated with said adjusting shaft to cause it to reciprocate according to the direction of rotation of the adjusting vanes.

11. In a hydraulic turbine runner, a shaft, a hollow hub, a plurality of adjustable blades on said hub, a reciprocatory adjusting shaft extending into and from said hub, means interconnecting said blades and said adjusting shaft for rotating said blades without preventing the rotation of the blades with the runner hub, adjusting vanes on said adjusting shaft below the blades on the runner hub, and means associated with said adjusting shaft to cause it to reciprocate according to the direction of rotation of the adjusting vanes, said adjusting vanes having their faces vertically disposed parallel with the vertical flow of water through the draft tube while the runner blades may be adjusted at an angle to the flow of water through the draft tube.

12. In a hydraulic turbine runner, a shaft, a hollow hub, a plurality of adjustable blades on said hub, a reciprocatory adjusting shaft extending into and from said hub, means interconnecting said blades and said adjusting shaft for rotating said blades without preventing the rotation of the blades with the runner hub, adjusting vanes on said adjusting shaft below the blades on the runner hub, means associated with said adjusting shaft to cause it to reciprocate according to the direction of rotation of the adjusting vanes, said adjusting vanes having their faces vertically disposed parallel with the vertical flow of water through the draft tube while the runner blades may be adjusted at an angle to the flow of water through the draft tube, and means for limiting the extent of rotation of the adjusting blades and the adjusting shaft.

13. In a hydraulic turbine runner, a shaft, a hollow hub, a plurality of adjustable blades on said hub, a reciprocatory adjusting shaft extending into and from said hub, means interconnecting said blades and said adjusting shaft for rotating said blades without preventing the rotation of the blades with the runner hub, adjusting vanes on said adjusting shaft below the blades on the runner hub, means associated with said adjusting shaft to cause it to reciprocate according to the direction of rotation of the adjusting vanes, said adjusting vanes having their faces vertically disposed parallel with the vertical flow of water through the draft tube while the runner blades may be adjusted at an angle to the flow of water through the draft tube. means for limiting the extent of rotation of the adjusting blades and the adjusting shaft, and gate means for controlling the extent of flow of water through the draft tube over the runner blades and the adjusting vanes.

14. In a hydraulic turbine, a runner shaft, a hub, a plurality of rotatable runner blades mounted in said hub having gears thereon, reciprocal racks engaging said gears mounted in said hub, a reciprocating adjusting shaft in said hub projecting therefrom engageable with said racks but freely rotatable, whereby the adjusting racks reciprocate together for adjusting the runner blades.

15. In a hydraulic turbine, a runner shaft, a hub, a plurality of rotatable runner blades mounted in said hub having gears thereon, reciprocal racks engaging said gears mounted in said hub, a reciprocating adjusting shaft in said hub projecting therefrom engageable with said racks but freely rotatable, whereby the adjusting racks reciprocate together for adjusting the runner blades, means for supporting said adjusting shaft, and means for causing it to rotate and reciprocate.

16. In a hydraulic turbine, a runner shaft, a hub, a plurality of rotatable runner blades mounted in said hub having gears thereon, reciprocal racks engaging said gears mounted in said hub, a reciprocating adjusting shaft in said hub projecting therefrom engageable with said racks but freely rotatable, whereby the adjusting racks reciprocate together for adjusting the runner blades, means for supporting said adjusting shaft, and means for causing it to rotate and reciprocate, said last mentioned means comprising adjusting vanes having their faces vertically disposed in the path of the fluid flowing over the runner blades and directed thereto thereby.

17. In a hydraulic turbine, a vertically-disposed runner shaft, a hollow hub, a second shaft depending therefrom in line with the first shaft and journaled in said hub, a stationary means for supporting said second shaft therebeneath and to cause it to reciprocate, vane means on said shaft below said hub adapted to cause it to rotate and with the adjustable runner blades connected to said shaft to be rotated thereby when the shaft reciprocates without preventing the bodily rotation of said blades about said adjusting shaft with the runner hub.

18. In a hydraulic turbine, a vertically-disposed runner shaft, a hollow hub, a second shaft depending therefrom in line with the first shaft and journaled in said hub, a stationary means for supporting said second shaft therebeneath and to cause it to reciprocate, vane means on said shaft below said hub adapted to cause it to rotate and with the adjustable runner blades connected to said shaft to be rotated thereby when the shaft reciprocates without preventing the bodily rotation of said blades about said adjusting shaft with the runner hub, and gate means for controlling the extent of introduction of fluid over said runner blades, and adjusting vanes.

19. In a hydraulic turbine, a vertically-disposed runner shaft, a hollow hub, a second shaft depending therefrom in line with the first shaft and journaled in said hub, a stationary means for supporting said second shaft therebeneath and to cause it to reciprocate, vane means on said shaft below said hub adapted to cause it to rotate and with the adjustable runner blades connected to said shaft to be rotated thereby when the shaft reciprocates without preventing the bodily rotation of said blades about said adjusting shaft with the runner hub, and gate means for controlling the extent of introduction of fluid over said runner blades and adjusting vanes, one of said adjusting vanes being longer than the other, and stop means on the draft tube engagable with the longer of said blades.

20. In a hydraulic turbine, a runner shaft and hub, a plurality of rotatable blades mounted therein, each having a hub, a blade shaft, an oppositely-disposed lug and segmental gear, a rack on each of the blade shafts, and a reciprocal rack member guided in said runner hub for engaging each of said segmental racks on the blade shafts whereby the blades are locked in position for rotation in the hub.

GEORGE A. BIGGS.